(12) United States Patent
Sasaki et al.

(10) Patent No.: US 6,646,829 B2
(45) Date of Patent: Nov. 11, 2003

(54) SLIDER MATERIALS

(75) Inventors: Yoshitaka Sasaki, Tokyo (JP); Akinori Koyama, Tokyo (JP); Hiroyuki Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/294,883

(22) Filed: Nov. 15, 2002

(65) Prior Publication Data

US 2003/0067714 A1 Apr. 10, 2003

Related U.S. Application Data

(62) Division of application No. 09/541,677, filed on Mar. 31, 2000, now Pat. No. 6,513,229.

(30) Foreign Application Priority Data

Oct. 21, 1999 (JP) ............................................. 11-300212

(51) Int. Cl.[7] .............................................. G11B 5/147
(52) U.S. Cl. .................. 360/126; 29/603.19; 360/234.3
(58) Field of Search ................................ 360/126, 121, 360/125; 29/603.1

(56) References Cited

U.S. PATENT DOCUMENTS

| 5,095,613 | A | 3/1992 | Hussinger et al. |
| 5,406,694 | A | 4/1995 | Ruiz |
| 5,531,017 | A | 7/1996 | Church et al. |
| 6,332,264 | B1 | 12/2001 | Itoh et al. |
| 6,374,479 | B1 | 4/2002 | Sasaki et al. |

FOREIGN PATENT DOCUMENTS

| JP | A-4-289511 | 10/1992 |
| JP | A-8-315341 | 11/1996 |
| JP | A-9-274714 | 10/1997 |
| JP | A-10-228617 | 8/1998 |

*Primary Examiner*—Allen Cao
(74) *Attorney, Agent, or Firm*—Oliff & Berridge, PLC

(57) ABSTRACT

An object of the invention is to facilitate processing and to obtain sliders as many as possible when the sliders for thin-film magnetic heads are manufactured through the use of a circular-plate-shaped wafer in which a plurality of rows of sections to be the sliders are aligned. The circular-plate-shaped wafer includes the rows of the sections to be the sliders aligned in one orientation. Each of the sections to be the sliders includes a thin-film magnetic head element. Three types of slider materials having different widths are cut out from the wafer. Each of the three types of slider materials includes rows of the sections to be the sliders. Processing including lapping is performed on a surface to be medium facing surfaces of each of the three types of slider materials. The materials are then separated to form slider aggregates each of which includes one of the rows of the sections to be the sliders. Rails are formed in a surface to be the medium facing surfaces of the slider aggregates. The slider aggregates are then separated.

8 Claims, 13 Drawing Sheets

SLIDER MATERIALS

This is a Division of application Ser. No. 09/541,677 filed Mar. 31, 2000. The entire disclosure of the prior application(s) is hereby incorporated by reference herein in its entirety.

BACKGROUND OF THE INVENTION

1. Field of the Invention

The present invention relates to a method of manufacturing sliders, a method of manufacturing slider materials, and slider materials that are used for manufacturing sliders for thin-film magnetic head's, for example.

2. Description of the Related Art

A flying-type thin-film magnetic head used for a magnetic disk device and so on is generally made up of a thin-film magnetic head slider (that may be simply called a slider) having a thin-film magnetic head element provided at the trailing edge of the slider. The slider generally comprises a rail whose surface functions as a medium facing surface (an air bearing surface) and a tapered section or a step near the end on the air inflow side. The rail flies slightly above the surface of a recording medium such as a magnetic disk by means of air flow from the tapered section or step.

A thin-film magnetic head element generally used is a composite-type element made up of layers of an induction magnetic transducer for writing and a magnetoresistive (MR) element for reading.

In general, such thin-film magnetic head sliders are formed through cutting a wafer in one direction in which sections to be sliders (called slider sections in the following description) each including a thin-film magnetic head element are arranged in a plurality of rows. A block called a bar in which the slider sections are arranged in a row is thereby formed. Rails are then formed in the bar and the bar is cut into the sliders.

The manufacturing process of the sliders includes a step of processing a surface to be the medium facing surface (hereinafter called the medium facing surface for convenience) of the bar, that is, grinding or lapping the medium facing surface and a step of cutting the wafer into the bars. The order of the step of processing the medium facing surface and the step of cutting the wafer into the bars depends on methods of processing the medium facing surface and cutting the wafer, as described later.

In the step of processing the medium facing surface, it is required that the MR height and the throat height of each thin-film magnetic head element formed in the bar fall within a tolerance range and that processing accuracy of the surface processed fall within a tolerance range. The MR height is the length (height) between an end of the MR element close to the medium facing surface and the other end. The throat height is the length (height) of the magnetic pole of an induction magnetic transducer between an end close to the medium facing surface and the other end.

In prior art the following method is generally taken to process the medium facing surfaces of bars and cutting a wafer into the bars. That is, a bar including a row of slider sections is cut from a wafer. The bar is fixed to a specific jig by bonding the surface of the bar opposite to the medium facing surface to the jig. The medium facing surface of the bar thus fixed to the jig is then processed. This method is called a first method in the following description. The first method is disclosed in, for example, Published Unexamined Japanese Patent Application Hei 10-228617 (1998), Published Unexamined Japanese Patent Application Hei 8-315341 (1996), and Published Unexamined Japanese Patent Application Hei 9-274714 (1997).

In prior art, second to sixth methods described below have been proposed, in addition to the above-described first method, for processing the medium facing surfaces of bars and cutting a wafer into the bars.

The second method is, as shown in FIG. 7 of U.S. Pat. No. 5,406,694, for example, a specific length of block including rows of slider sections is cut from a wafer. The block is fixed to a specific jig by bonding the surface of the block opposite to the medium facing surface to the jig. The medium facing surface of the block thus fixed to the jig is then processed. The block is then cut into bars whose medium facing surfaces have been processed.

The third method is, as shown in FIG. 3 of Published Unexamined Japanese Patent Application Hei 4-289511 (1992), for example, a wafer is fixed to a specific jig and the medium facing surface of the wafer fixed to the jig is processed. The wafer is then cut into bars whose medium facing surfaces have been processed.

The fourth method is, as shown in FIG. 7 of Published Unexamined Japanese Patent Application Hei 4-289511, for example, a wafer or a block having a specific length and including rows of slider sections cut from a wafer is utilized. A reference surface opposite to the medium facing surface of the wafer or block is processed. The wafer or block is then fixed to a specific jig by bonding the reference surface to the jig. The wafer or block is cut at a position to be the medium facing surface. A bar is thus separated while fixed to the jig and the medium facing surface of the bar is processed.

The fifth method is, as shown in FIG. 8 and FIG. 9 of Published Unexamined Japanese Patent Application Laid-open Hei 4-289511, for example, a wafer utilized has slider sections formed such that medium facing surfaces of adjacent rows face each other or surfaces opposite to the medium facing surfaces of adjacent rows face each other. The wafer is cut at a position where the surfaces opposite to the medium facing surfaces face each other to obtain a block including two rows of slider sections. A specific jig is fixed to each end face of the block through the use of an adhesive. The block is then cut at a position where the medium facing surfaces face each other to separate the block into two bars each fixed to the jig. The medium facing surface of each bar is then processed.

The sixth method is, as shown in FIG. 10 and FIG. 11 of Published Unexamined Japanese Patent Application Hei 4-289511, for example, a wafer utilized has slider sections formed such that medium facing surfaces of adjacent rows face each other or surfaces opposite to the medium facing surfaces of adjacent rows face each other. The wafer is cut at a position where the medium facing surfaces face each other to obtain a block including two rows of slider sections. A specific jig is fixed to one medium facing surface of the block through the use of an adhesive. The other medium facing surface of the block is then processed. A specific jig is fixed to the other medium facing surface thus processed through the use of an adhesive. The jig is detached from the one medium facing surface and this medium facing surface is processed. The block is cut at a position where the surfaces opposite to the medium facing surfaces face each other to separate the block into two bars.

Of the foregoing methods, in the first method the bar including a row of slider sections is cut from the wafer. The bar is fixed to the jig and the medium facing surface of the separated bar is then processed. Consequently, the bar is often affected by the state of the interface between the bar and the jig or by warpage caused by bonding and likely to be deformed and to form a curvature and the like. As a result, it is likely that processing accuracy of the surface of the bar processed is reduced and deformation occurs, such as curvatures of the layers (pattern) making up the thin-film magnetic head elements formed in the bar. In addition, it is difficult to precisely control the resistance of the MR element, the MR height and the throat height. It is therefore difficult to precisely fabricate thin-film magnetic head sliders with excellent properties.

In the fifth and sixth methods, the block including two rows of slider sections is cut from the wafer and the block is fixed to the jig. In this case, too, problems similar to those of the first method described above may result since the block is thin and easy to deform. Furthermore, in the fifth and sixth methods, in the block including two rows of slider sections, the thin-film magnetic head elements in one of the rows are opposite in direction to the head elements in the other row. As a result, the number of steps required for processing the medium facing surface and separating the bar increases.

In contrast, the second to fourth methods do not include the step of fixing a separate bar or block including two rows of slider sections cut off from a wafer to the jig. Therefore, the above-stated problems are reduced.

However, in the third and fourth methods, every time a bar is separated, the step is required for fixing the wafer or block to the jig or detaching the bar or block from the jig. The manufacturing process is thereby complicated and the production efficiency is reduced. In the third method, the shape of the wafer as an object whose medium facing surface is processed is changed, depending on the number of rows of slider sections remaining in the wafer. Consequently, handling of the wafer is inconvenient when the medium facing surface is processed. In the fourth method, too, handling of the wafer is inconvenient when the medium facing surface is processed since the length of each bar separated varies.

In the second method, in contrast, the block utilized includes a plurality of rows of slider sections and has a specific width. The thin-film magnetic head elements in the slider sections face toward one direction. The steps of processing the medium facing surface and separating the bar are repeated. These steps are thus easily performed.

A block as the one used in the second method, for example, that includes rows of slider sections and has a specific width is obtained from a rectangular wafer without waste.

In contrast, to obtain a block having a specific width from a circular wafer, a single rectangular block 202 is obtained from a circular wafer 201 in prior art, as shown in FIG. 15.

However, when the block 202 is obtained as described above, a relatively large portion of the wafer 201 from the periphery of the block 202 to the periphery of the wafer 201 is wasted. Therefore, the number of sliders obtained from the single wafer 201 is reduced.

SUMMARY OF THE INVENTION

It is an object of the invention to provide a method of manufacturing sliders, a method of manufacturing slider materials, and slider materials for facilitating processing and increasing the number of sliders obtained as large as possible when sliders are fabricated through the use of a circular-plate-shaped wafer in which rows of sections to be sliders are arranged.

A method of the invention is provided for manufacturing slider materials. The slider materials are used for fabricating sliders having medium facing surfaces on which specific processing is performed. The slider materials each have a specific width and include a plurality of rows of sections to be the sliders aligned in one orientation. The method includes the steps of: fabricating a circular-plate-shaped wafer including the plurality of rows of the sections to be the sliders aligned in the one orientation; and forming the slider materials through cutting a plurality of types of slider materials having different widths out of the wafer.

A method of the invention is provided for manufacturing sliders having medium facing surfaces on which specific processing is performed. The method includes the steps of: fabricating a circular-plate-shaped wafer including a plurality of rows of sections to be the sliders aligned in one orientation; forming slider materials through cutting a plurality of types of the slider materials having different widths out of the wafer, the slider materials each having a specific width and including some of the rows of the sections to be the sliders aligned in the one orientation; performing the specific processing on one of the rows of the sections to be the sliders located at an end of each of the slider materials; forming a slider aggregate made up of the one of the rows of the sections to be the sliders on which the processing has been performed, through cutting each of the slider materials having gone through the processing; and forming the sliders through separating the slider aggregate.

Slider materials of the invention each have a specific width and include a plurality of rows of sections to be sliders aligned in one orientation. The slider materials are obtained through cutting a plurality of types of the slider materials having different widths out of a circular-plate-shaped wafer including the plurality of rows of the sections to be the sliders aligned in the one orientation.

According to the method of manufacturing slider materials, the method of manufacturing sliders, or the slider materials of the invention, the slider materials are formed through cutting a plurality of types of slider materials having different widths out of the circular-plate-shaped wafer. As a result, the number of the sliders obtained from the wafer is as large as possible.

In the invention one orientation means that portions to be the medium facing surfaces of the sections to be the sliders face one direction.

In the method of manufacturing slider materials, the method of manufacturing sliders, or the slider materials of the invention, a diameter of the wafer is any of 76.2 mm (3 inches), 152.4 mm (6 inches) and 203.2 mm (8 inches).

In the method of manufacturing slider materials, the method of manufacturing sliders, or the slider materials, the number of the types of the slider materials may be two. In this case, the widths of the slider materials may be two types of 69.6 mm±5% and 57.6 mm±5%.

In the method of manufacturing slider materials, the method of manufacturing sliders, or the slider materials, the number of the types of the slider materials may be three. In this case, the widths of the slider materials may be three types of 69.6 mm±5%, 57.6 mm±5%, and 38.4 mm±5%.

In the method of manufacturing slider materials, the method of manufacturing sliders, or the slider materials, the slider materials may include four to ten rows of the sections to be the sliders.

In the method of manufacturing slider materials, the method of manufacturing sliders, or the slider materials, the sections to be the sliders may include thin-film magnetic head elements.

In the method of manufacturing slider materials, the method of manufacturing sliders, or the slider materials, the step of performing the specific processing may include lapping of surfaces to be the medium facing surfaces.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Reference is now made to FIG. 1 to FIG. 5 to describe slider materials and a method of manufacturing the same of the embodiment of the invention. The slider materials of the embodiment are used for manufacturing sliders each of which includes a thin-film magnetic head element and has a medium facing surface on which specific processing is performed. Each of the slider materials includes a plurality of rows of sections to be sliders (hereinafter called slider sections) arranged in one orientation and has a specific width. The method of manufacturing slider materials of the embodiment includes the steps of: fabricating a circular-plate-shaped wafer including a plurality of rows of slider sections arranged in one orientation; and separating a plurality of types of slider materials having widths different from one another from the wafer to obtain slider materials.

In this embodiment the diameter of the circular-plate-shaped wafer may be 76.2 mm (3 inches), 152.4 mm (6 inches), or 203.2 mm (8 inches), for example. In the following description the wafers each having a diameter of 76.2 mm (3 inches), 152.4 mm (6 inches), or 203.2 mm (8 inches) are called a 3-inch wafer, a 6-inch wafer, and an 8-inch wafer, respectively. In this embodiment the number of types of slider materials may be two or three, for example.

Figure 1:
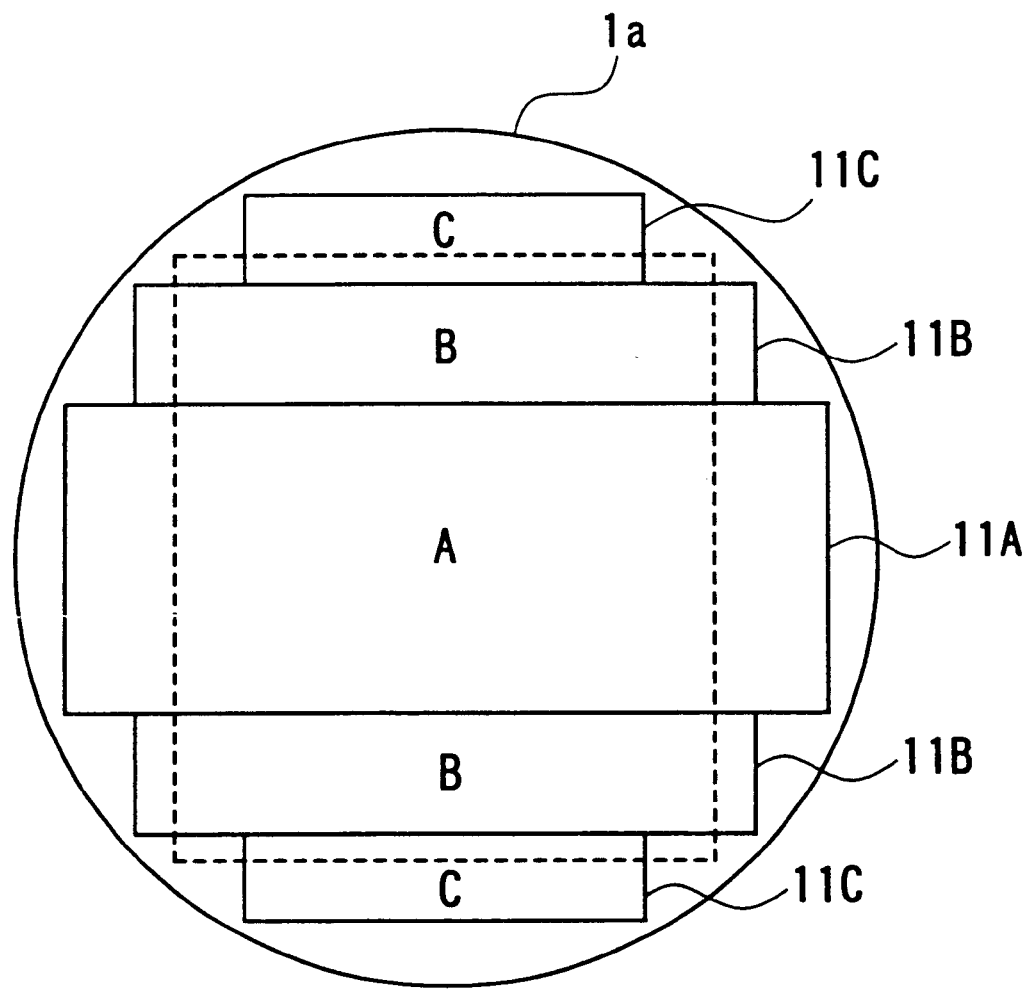
FIG. 1 is an explanatory view illustrating an example of arrangement of slider materials in the case in which three types of slider materials are cut out from a 3-inch wafer, according to an embodiment of the invention.

FIG. 1 is an explanatory view illustrating an example of arrangement of slider materials for obtaining three types of slider materials from a 3-inch wafer. In this example three types of slider materials 11A, 11B and 11C are obtained from a 3-inch wafer 1a. In FIG. 1 to FIG. 5 the slider materials 11A, 11B and 11C are also indicated with A, B and C, respectively, for convenience. The slider materials 11A, 11B and 11C each include a plurality of rows of slider sections arranged in one orientation and have a specific width. In FIG. 1 a plurality of rows of slider sections are horizontally arranged and each of the rows is located on top or at the bottom of the adjacent one of the rows. The width of each of the slider materials 11A, 11B and 11C is the horizontal length of each of the slider materials 11A, 11B and 11C in FIG. 1. Among the slider materials 11A, 11B and 11C, the material 11A is greatest in width and the material 11B is the second greatest. The material 11C is smallest.

In the example shown in FIG. 1, the slider material 11A is cut out from a portion of the 3-inch wafer 1a located in the center in the vertical direction. The slider materials 11B are cut out from portions on top of and at the bottom of the material 11A, respectively. The slider materials 11C are cut out from portions on top of and at the bottom of the material 11B, respectively. The region extending from the periphery of the wafer 1a toward the interior and having a specific width is excluded from the portions to be the slider materials. In FIG. 1 a broken line indicates the size of a prior-art block cut out from the wafer 1a.

The width of the slider material 11A may be 69.6 mm ±5%, for example. The width of the slider materials 11B may be 57.6 mm ±5%, for example. The width of the slider materials 11C may be 38.4 mm ±5%, for example. Of each of the materials 11A to 11C, slider sections located in a region having a specific width (about the width of two slider sections) from ends toward the middle across the width are rejected. The rest of the slider sections are utilized.

For example, the pitch of the slider sections in a row is 1.15 mm, and the pitch of rows of the slider sections is 0.48 mm. In this case, in the example shown in FIG. 1, the slider material 11A includes 62 rows of 56 usable slider sections, for example. The two slider materials 11B each include 19 rows of 46 usable slider sections, for example. The two slider materials 11C each include 12 rows of 30 usable slider sections, for example.

Figure 2:
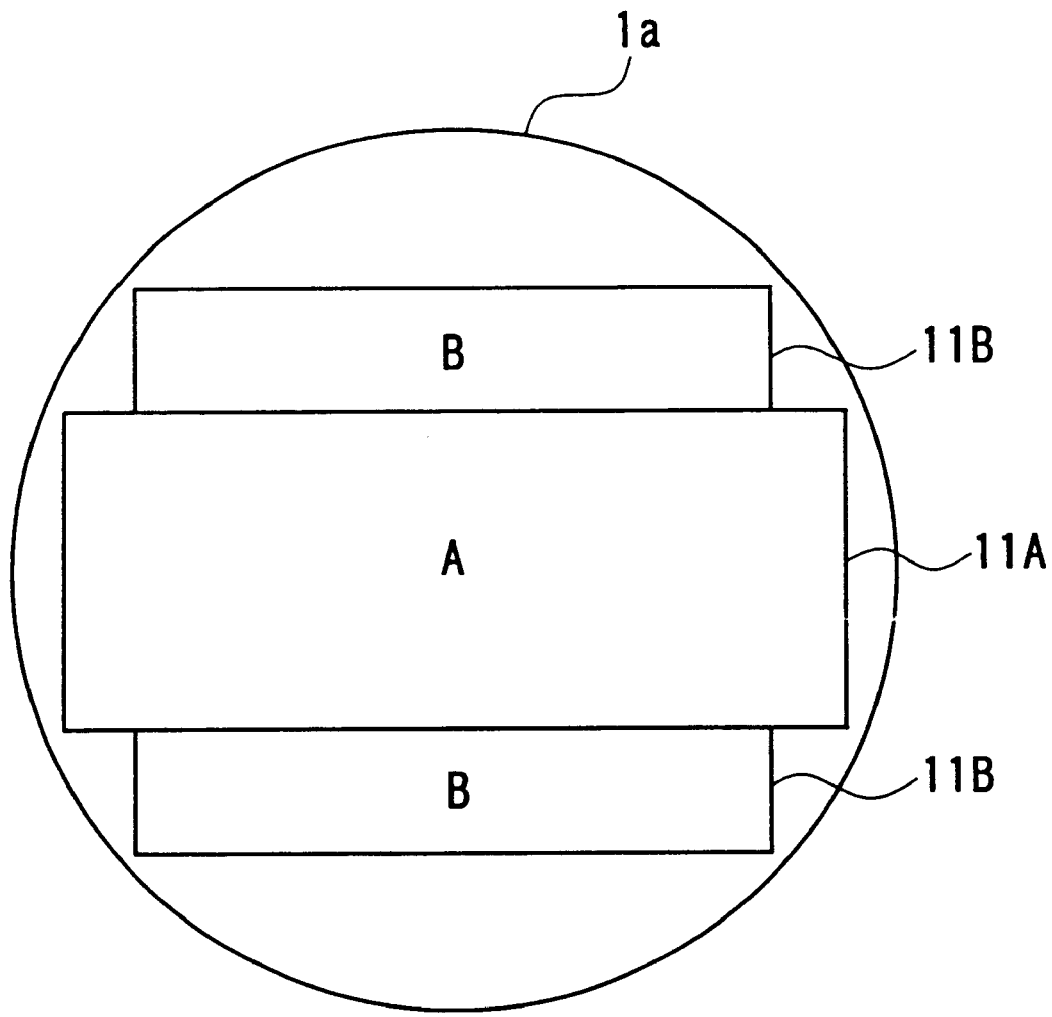
FIG. 2 is an explanatory view illustrating an example of arrangement of slider materials in the case in which two types of slider materials are cut out from a 3-inch wafer, according to the embodiment.

FIG. 2 is an explanatory view illustrating an example of arrangement of slider materials for obtaining two types of slider materials from a 3-inch wafer. In this example two types of slider materials 11A and 11B are obtained from the 3-inch wafer 1a. The arrangement of the slider materials 11A and 11B in the wafer 1a is similar to the example shown in FIG. 1.

Figure 3:
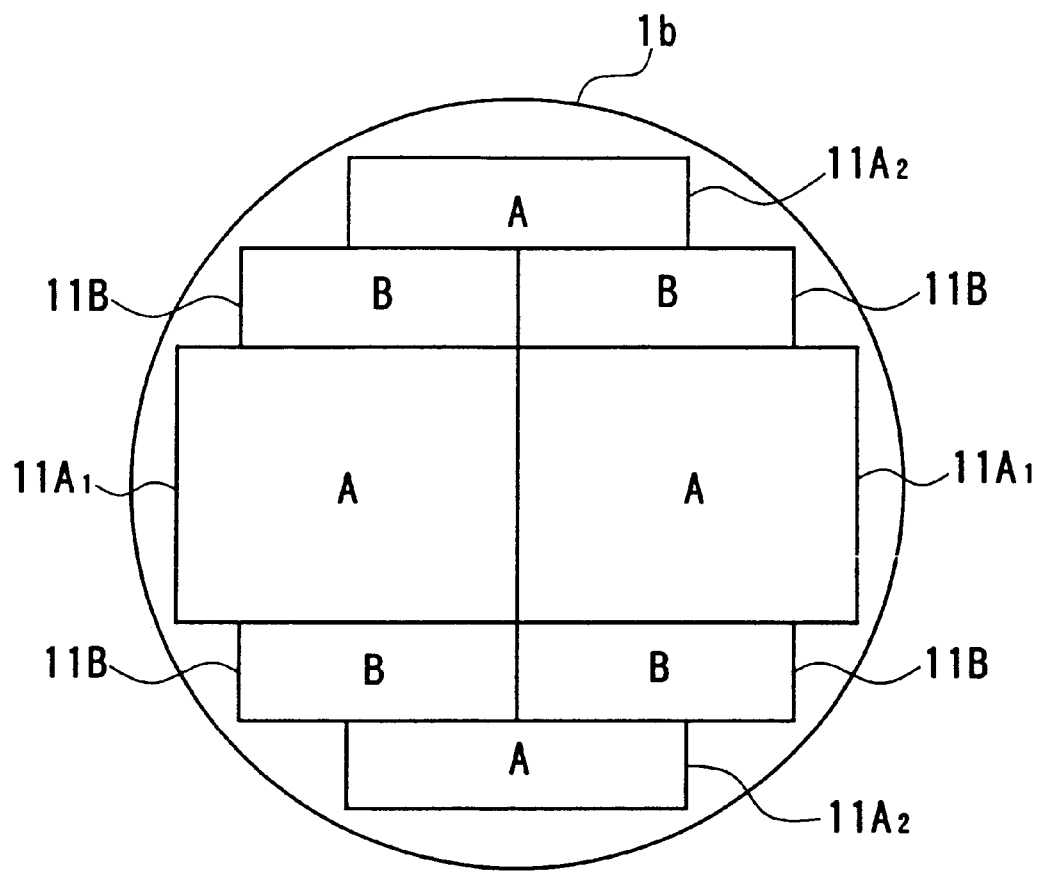
FIG. 3 is an explanatory view illustrating an example of arrangement of slider materials in the case in which two types of slider materials are cut out from a 6-inch wafer, according to the embodiment.

FIG. 3 is an explanatory view illustrating an example of arrangement of slider materials for obtaining two types of slider materials from a 6-inch wafer. In the example shown in FIG. 3, two slider materials $11A_1$ placed side by side are cut out from a portion of the 6-inch wafer $1b$ located in the center in the vertical direction. The slider materials 11B are cut out from portions on top of and at the bottom of each of the materials $11A_1$. Slider materials $11A_2$ are each cut out from a portion on top of upper ones of the materials 11B and a portion at the bottom of lower ones of the materials 11B. The slider materials $11A_1$ and $11A_2$ belong to the same type as the slider material 11A and are the same as the material 11A in width.

Here, the pitch of the slider sections in a row, the pitch of rows of the slider sections, and the number of usable slider sections in a row in each of the slider materials are assumed to be similar to the example shown in FIG. 1. In this case, in the example shown in FIG. 3, the slider materials $11A_1$ each include 100 rows of slider sections, for example. The slider materials $11A_2$ each include 40 rows of slider sections, for example. The slider materials 11B each include 42 rows of slider sections, for example.

Although the two kinds of slider materials are obtained from the 6-inch wafer in the example shown in FIG. 3, the slider materials 11C in place of the materials $11A_2$ may be cut out so that the three kinds of slider materials are obtained from the 6-inch wafer.

Figure 4:
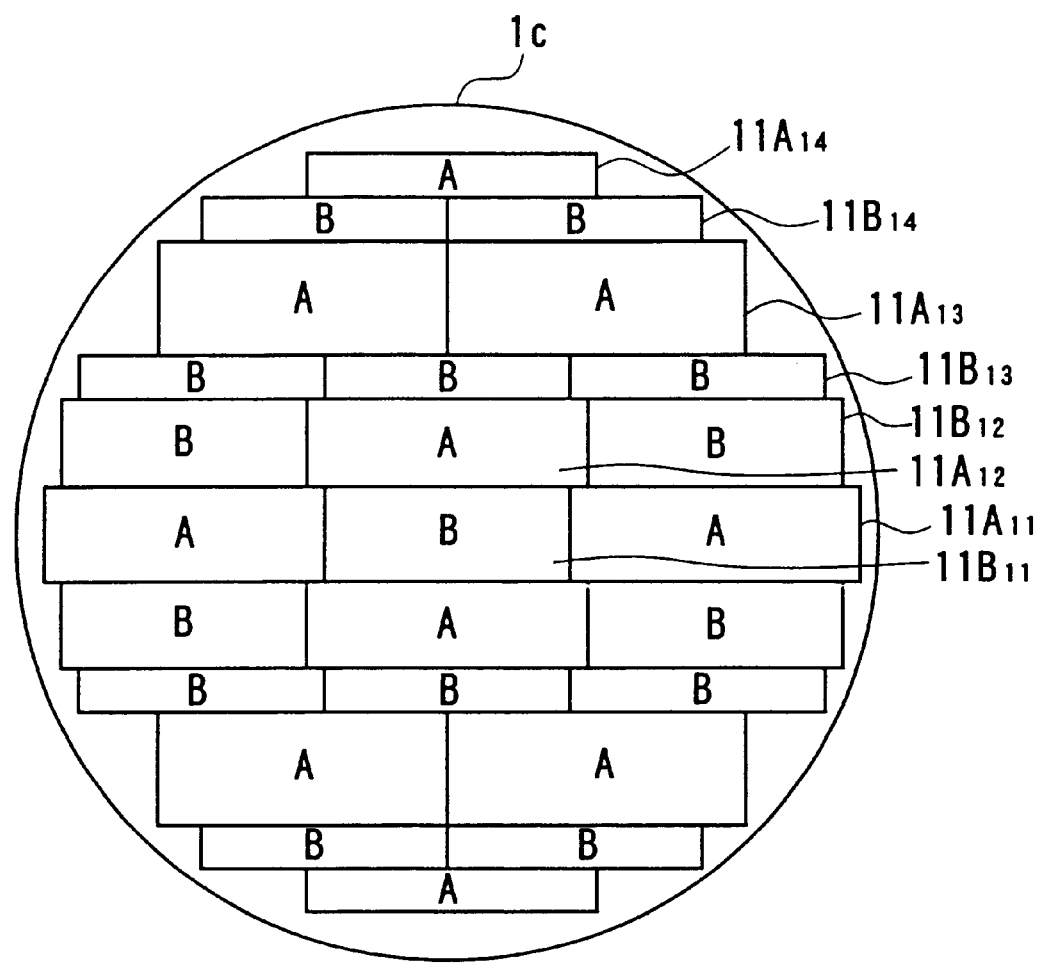
FIG. 4 is an explanatory view illustrating an example of arrangement of slider materials in the case in which two types of slider materials are cut out from an 8-inch wafer, according to the embodiment.

FIG. 4 is an explanatory view illustrating an example of arrangement of slider materials for obtaining two types of slider materials from an 8-inch wafer. In the example shown in FIG. 4, in a portion of the 8-inch wafer $1c$ located in the center in the vertical direction, a slider material $11B_{11}$ is cut out from a portion of the wafer $1c$ located in the center in the horizontal direction. Slider materials $11A_{11}$ are cut out from portions on sides of the slider material $11B_{11}$. Slider materials $11A_{12}$ are cut out from portions on top of and at the bottom of the materials $11A_{11}$ and $11B_{11}$, the portions located in the middle in the horizontal direction. Slider materials $11B_{12}$ are cut out from portions on sides of the slider material $11A_{12}$. Three slider materials $11B_{13}$ placed side by side are cut out from a portion on top of upper ones of the material $11A_{12}$ and $11B_{12}$. Another three slider materials $11B_{13}$ placed side by side are cut out from a portion at the bottom of lower ones of the material $11A_{12}$ and $11B_{12}$. Two slider materials $11A_{13}$ placed side by side are cut out from a portion on top of upper ones of the materials $11B_{13}$. Another two slider materials $11A_{13}$ placed side by side are cut out from a portion at the bottom of lower ones of the materials $11B_{13}$. Two slider materials $11B_{14}$ placed side by side are cut out from a portion on top of upper ones of the materials $11A_{13}$. Another two slider materials $11B_{14}$ placed side by side are cut out from a portion at the bottom of lower ones of the materials $11A_{13}$. Slider materials $11A_{14}$ are each cut out from a portion on top of upper ones of the materials $11B_{14}$ and a portion at the bottom of lower ones of the materials $11B_{14}$.

The slider materials $11A_{11}$, $11A_{12}$, $11A_{13}$ and $11A_{14}$ belong to the same type as the slider material 11A and are the same as the material 11A in width. Similarly, the slider materials $11B_{11}$, $11B_{12}$, $11B_{13}$ and $11B_{14}$ belong to the same type as the slider material 11B and are the same as the material 11B in width.

Here, the pitch of the slider sections in a row, the pitch of rows of the slider sections, and the number of usable slider sections in a row in each of the slider materials are assumed to be similar to the example shown in FIG. 1. In this case, according to the example shown in FIG. 4, for example: the slider materials $11A_{11}$ and $11B_{11}$ each include 74 rows of slider sections; the slider materials $11A_{12}$ and $11B_{12}$ each include 48 rows of slider sections; the slider materials $11B_{13}$ each include 19 rows of slider sections; the slider materials $11A_{13}$ each include 47 rows of slider sections; the slider materials $11B_{14}$ each include 20 rows of slider sections; and the slider materials $11A_{14}$ each include 19 rows of slider sections.

Figure 5:
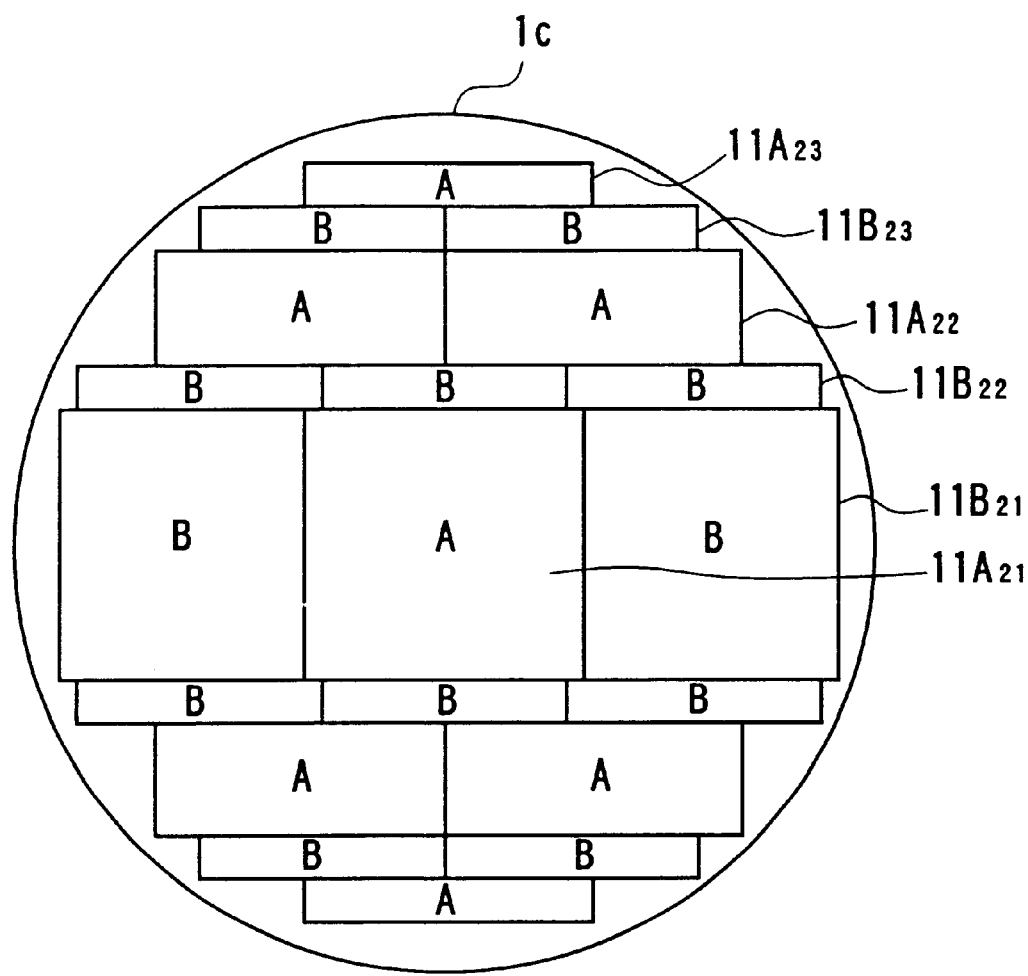
FIG. 5 is an explanatory view illustrating another example of arrangement of slider materials in the case in which two types of slider materials are cut out from an 8-inch wafer, according to the embodiment.

FIG. 5 is an explanatory view illustrating an example of arrangement of slider materials for obtaining two types of slider materials from an 8-inch wafer. In the example shown in FIG. 5, in a portion of the 8-inch wafer $1c$ located in the center in the vertical direction, a slider material $11A_{21}$ is cut out from a portion of the wafer $1c$ located in the center in the horizontal direction. Slider materials $11B_{21}$ are cut out from portions on sides of the slider material $11A_{21}$. Three slider materials $11B_{22}$ placed side by side are cut out from a portion on top of the materials $11A_{21}$ and $11B_{21}$. Another three slider materials $11B_{22}$ placed side by side are cut out from a portion at the bottom of the materials $11A_{21}$ and $11B_{21}$. Two slider materials $11A_{22}$ placed side by side are cut out from a portion on top of upper ones of the materials $11B_{22}$. Another two slider materials $11A_{22}$ placed side by side are cut out from a portion at the bottom of lower ones of the materials $11B_{22}$. Two slider materials $11B_{23}$ placed side by side are cut out from a portion on top of upper ones of the materials $11A_{22}$. Another two slider materials $11B_{23}$ placed side by side are cut out from a portion at the bottom of lower ones of the materials $11A_{22}$. Slider materials $11A_{23}$ are each cut out from a portion on top of upper ones of the materials $11B_{23}$ and a portion at the bottom of lower ones of the materials $11B_{23}$.

The slider materials $11A_{21}$, $11A_{22}$ and $11A_{23}$ belong to the same type as the slider material 11A and are the same as the material 11A in width. Similarly, the slider materials $11B_{21}$, $11B_{22}$ and $11B_{23}$ belong to the same type as the slider material 11B and are the same as the material 11B in width.

Here, the pitch of the slider sections in a row, the pitch of rows of the slider sections, and the number of usable slider sections in a row in each of the slider materials are assumed to be similar to the example shown in FIG. 1. In this case, according to the example shown in FIG. 5, for example: the slider materials $11A_{21}$ and $11B_{21}$ each include 170 rows of slider sections; the slider materials $11B_{22}$ each include 20 rows of slider sections; the slider materials $11A_{22}$ each include 45 rows of slider sections; the slider materials $11B_{23}$ each include 20 rows of slider sections; and the slider materials $11A_{23}$ each include 20 rows of slider sections.

Although the two types of slider materials are obtained from the 8-inch wafer in each of the examples shown in FIG. 4 and FIG. 5, three slider materials 11C in place of the two materials $11B_{14}$ or the two materials $11B_{23}$ placed side by side may be cut out so that the three types of slider materials are obtained from the 8-inch wafer.

Figure 6:
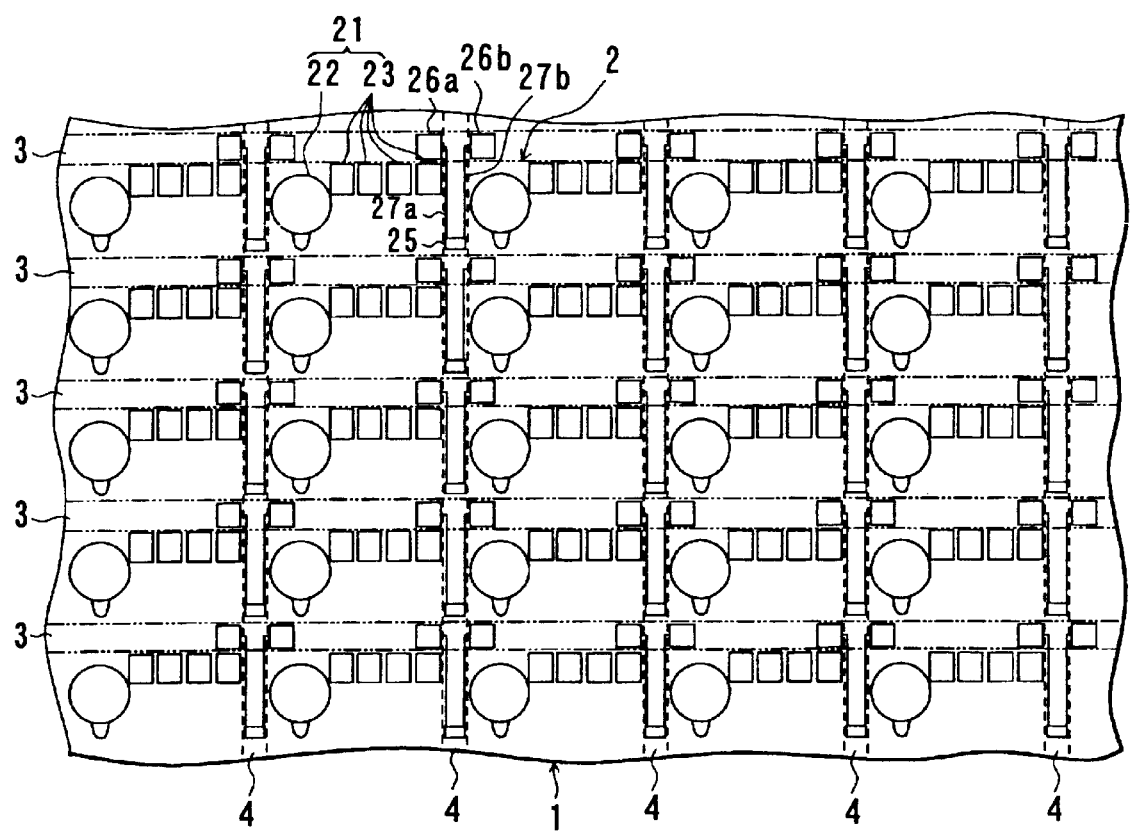
FIG. 6 is an explanatory view illustrating part of a wafer of an embodiment of the invention.

Reference is now made to FIG. 6 to describe the configuration of the wafer of the embodiment. FIG. 6 shows part of the wafer. In the wafer 1 (that represents the wafers $1a$, $1b$ and $1c$) a plurality of rows of slider sections 2 are aligned. The wafer 1 includes: inter-row cutting sections 3 each provided to be a position at which adjacent ones of the rows are to be separated; and intra-row cutting sections 4 provided to be a position at which adjacent ones of the slider sections 2 are to be separated in each row.

In each of the slider sections 2 a thin-film magnetic head element 21 is formed. Each of the head elements 21 has: an element section 22 including an induction-type magnetic transducer and an MR element; and a plurality of electrodes 23 for electrically connecting the element section 22 to an external device. In the wafer 1 the slider sections 2 are arranged in one orientation. The head elements 21 in the slider sections 2 face one direction.

In the wafer 1 a detection element 25 for detecting an amount of processing is formed near the medium-facing-surface-side end of each of the intra-row cutting sections 4. In the wafer 1 electrodes 26a and 26b for monitoring are formed in each of the inter-row cutting sections 3 for electrically connecting the detection element 25 to an external device. Furthermore, in the wafer 1 two leads 27a and 27b for monitoring are formed in each of the intra-row cutting sections 4 as conductors for electrically connecting the detection element 25 to the respective electrodes 26a and 26b. The detection element 25 may be a resistance element whose resistance value changes in response to its dimensions.

Reference is now made to FIG. 7 to FIG. 14 to describe a method of manufacturing slider materials and a method of manufacturing thin-film magnetic heads of an embodiment of the invention in detail. The method of manufacturing slider materials of this embodiment includes the steps of forming a wafer and fabricating slider materials. In addition to these steps, the method of manufacturing thin-film magnetic heads of this embodiment includes the steps of: processing; fabricating a slider aggregate; and fabricating sliders.

In the steps of forming a wafer, the circular-plate-shaped wafer 1 is formed. The wafer 1 includes a plurality of rows of slider sections aligned in one orientation. In the step of fabricating slider materials, a plurality of kinds of slider materials 11 (that represents 11A to 11C, 11A$_1$, 11A$_2$, 11A$_1$ to 11A$_{14}$, 11B$_{11}$ to 11B$_{14}$, 11A$_{21}$ to 11A$_{23}$, 11B$_{21}$ to 11B$_{23}$) having different widths are cut out from the wafer 1. Each of the slider materials 11 includes rows of slider sections aligned in one orientation and has a specific width. The slider materials 11 are thus obtained.

In the step of processing, specific processing is performed on one of the rows of slider sections located at an end of one of the slider materials 11. This processing includes lapping a surface to be a medium facing surface. In the step of fabricating a slider aggregate, the slider materials processed are separated to obtain a slider aggregate made up of a row of slider sections processed. In the step of fabricating sliders, the slider aggregate is separated to obtain sliders.

Figure 7:
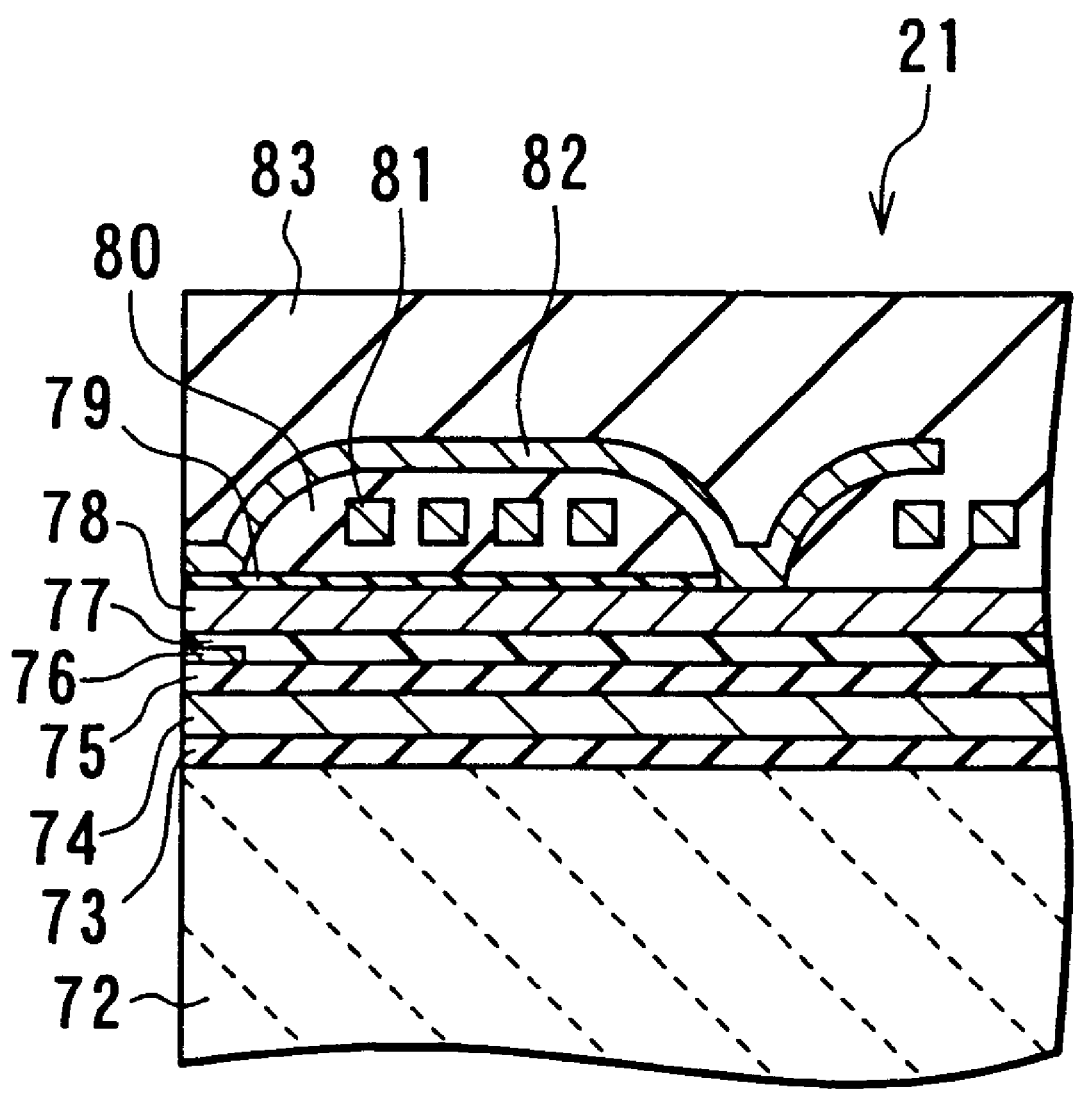
FIG. 7 is a cross section of a thin-film magnetic head element portion in the wafer of the embodiment.
Figure 8:
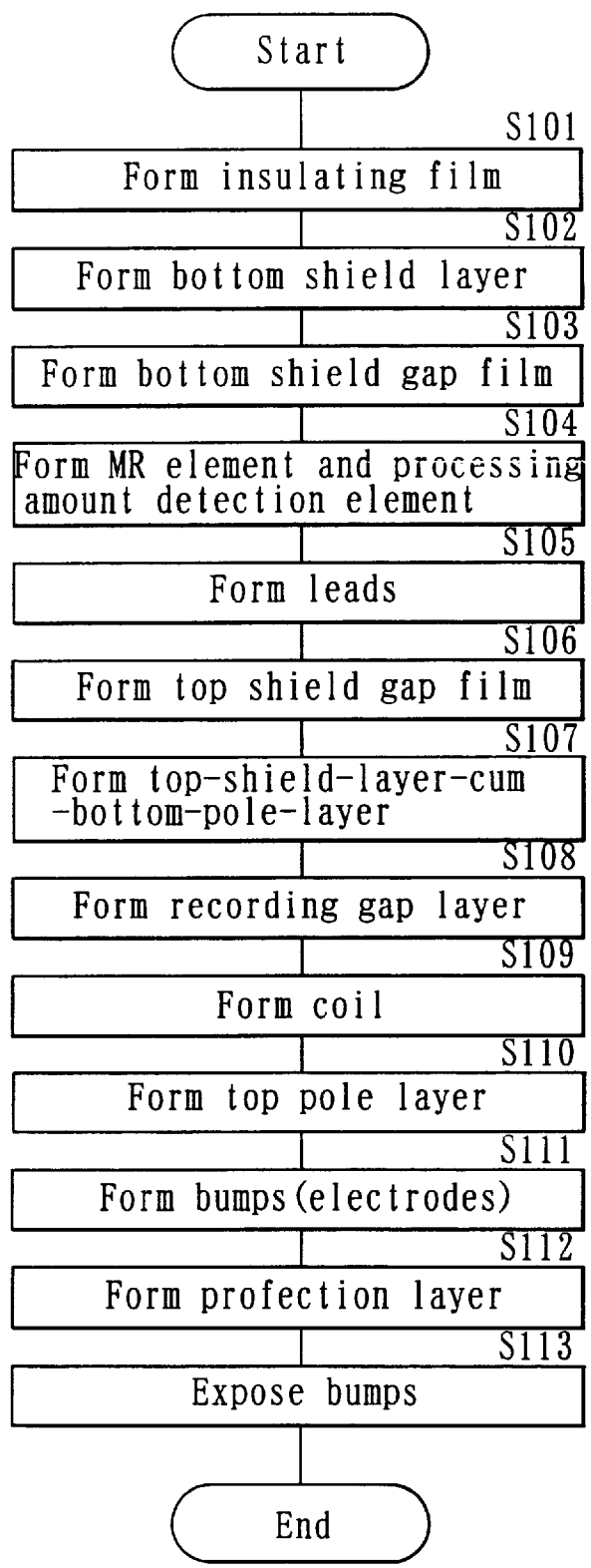
FIG. 8 is a flowchart for illustrating manufacturing steps of the wafer of the embodiment.

The foregoing steps will now be described in detail. Referring to FIG. 7 and FIG. 8, the step of forming a wafer will be first described. FIG. 7 is a cross section of the thin-film magnetic head element 21 in the wafer 1. FIG. 8 is a flowchart showing manufacturing steps of the wafer 1.

According to the manufacturing steps of the wafer 1, an insulating film 73 made of alumina (Al$_2$O$_3$), for example, is formed on a substrate 72 made of aluminum oxide and titanium carbide (Al$_2$O$_3$—TiC), for example (step S101). Next, a bottom shield layer 74 for a reproducing head is formed on the insulating film 73 (step S102). A bottom shield gap film 75 made of alumina, for example, is then formed on the bottom shield layer 74 (step S103). Next, an MR element 76 for reproduction is formed on the bottom shield gap film 75. At the same time, the detection element 25 is formed on the bottom shield gap film 75 (step S104).

Next, two leads (not shown) are formed on the bottom shield gap film 75 and the MR element 76 such that one end of each of the leads is connected to the MR element 76. At the same time, the two leads 27a and 27b for monitoring are formed on the bottom shield gap film 75 and the detection element 25 such that one end of each of the leads is electrically connected to the detection element 25 (step S105).

Next, a top shield gap film 77 is formed on the bottom shield gap film 75 and the MR element 76 (step S106), and the MR element 76 is embedded in the shield gap films 75 and 77. A top-shield-cum-bottom-pole layer 78 is then formed on the top shield gap film 77 (step S107). Next, a recording gap layer 79 made of alumina, for example, is formed on the top-shield-cum-bottom-pole layer 78 (step S108). A thin-film coil 81 is formed on a photoresist layer 80 on the recording gap layer 79 (step S109). The coil 81 is further covered with the photoresist layer 80. Next, a top pole layer 82 is formed on the photoresist layer 80 (step S110). A rear portion of the top pole layer 82 (on the right side of FIG. 7) is in contact with the top-shield-cum-bottom-pole layer 78 and magnetically coupled thereto.

Next, a bump (an electrode) not shown that is connected to the MR element 76 and a bump not shown that is connected to the thin-film coil 81 are formed. At the same time, bumps not shown that are to be the electrodes 26a and 26b for monitoring are formed such that lower ends thereof are electrically connected to the leads 27a and 27b (step S111). Next, a protection layer 83 made of alumina, for example, is formed to cover the top pole layer 82 (step S112). The bumps are covered with the protection layer 83. Finally, the top surface of the protection layer 83 is polished and the bumps are exposed (step S113).

Next, in the step of fabricating slider materials, as already described with reference to FIG. 1 to FIG. 5, a plurality of kinds of slider materials 11 are cut out from the circular-plate-shaped wafer 1 to obtain the slider materials. To cut the wafer 1 a cutting apparatus used for semiconductor manufacturing that has a blade to which abrasive grains of diamond, for example, are bonded is used.

The step of processing will now be described. In this step specific processing is performed on one of the rows of slider sections that is located at an end of one of the slider materials 11. It is preferred to utilize the slider materials 11 including four to ten rows of slider sections in this step, as described later. Therefore, if the slider materials 11 cut out from the wafer 1 include a number of rows of slider sections in the step of fabricating slider materials, it is preferred to divide the materials 11 into a plurality of materials 11 each including four to ten rows of slider sections.

Figure 9:
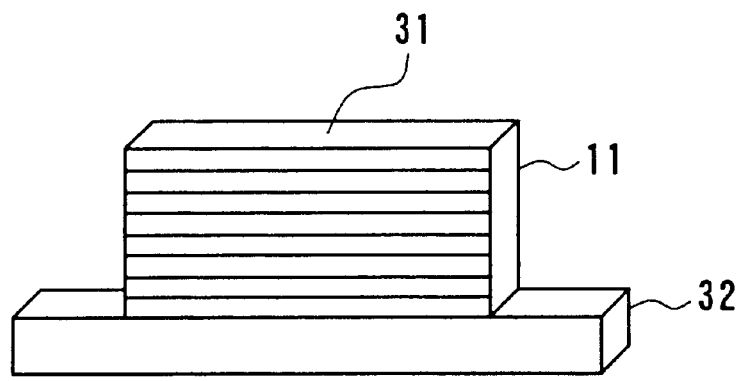
FIG. 9 is a perspective view illustrating the slider material of the embodiment joined to a processing jig.
Figure 10:
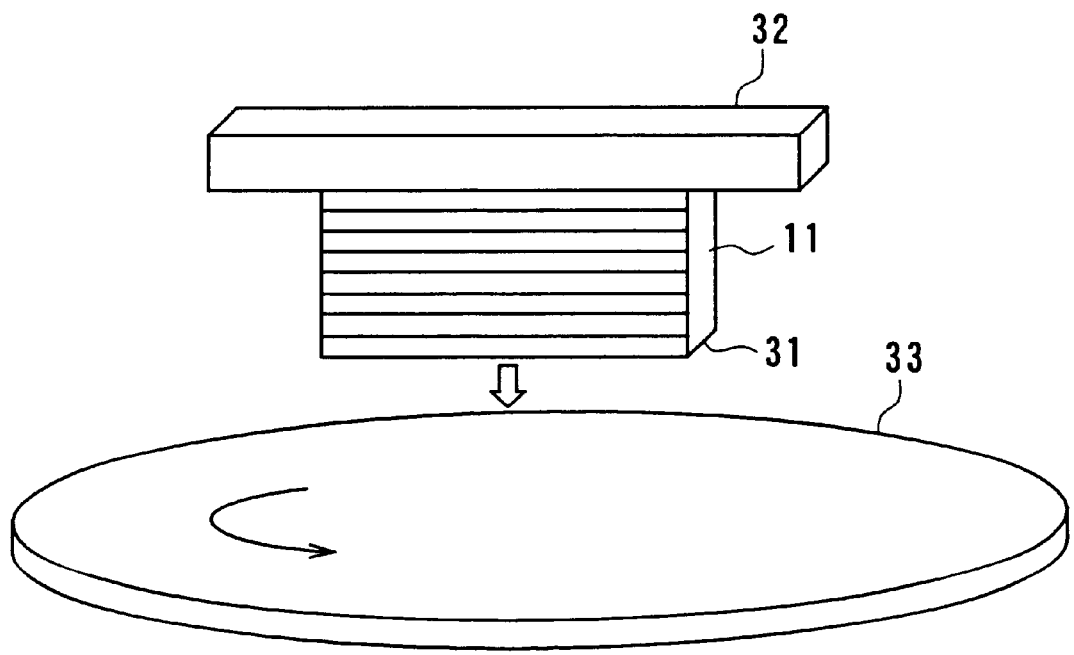
FIG. 10 is an explanatory view for illustrating the step of lapping the slider material of the embodiment.

In the step of processing, as shown in FIG. 9, an end face of the slider material 11 is bonded to a processing jig 32. The end face thus bonded is opposite to the end face 31 where the medium facing surface is located. Next, processing is performed on the end face 31 of the slider material 11 bonded to the jig 32, that is, the surface to be the medium facing surface. Such processing is grinding using a grinding apparatus, lapping using a lapping apparatus 33 shown in FIG. 10, and so on. The MR heights and the throat heights are thereby precisely defined.

To lap the end face 31 of the slider material 11, output signals of each detection element 25 obtained through the electrodes 26 in a row of slider sections including the end face 31 are monitored. Pressure applied to each part of the slider material 11 is adjusted in response to the output signals. Through this operation the end face 31 is lapped while the straightness of the pattern of the thin-film magnetic head elements 21 located in the medium facing surface is adjusted. The MR heights and throat heights of the head elements 21 in the row are precisely defined.

Figure 11:
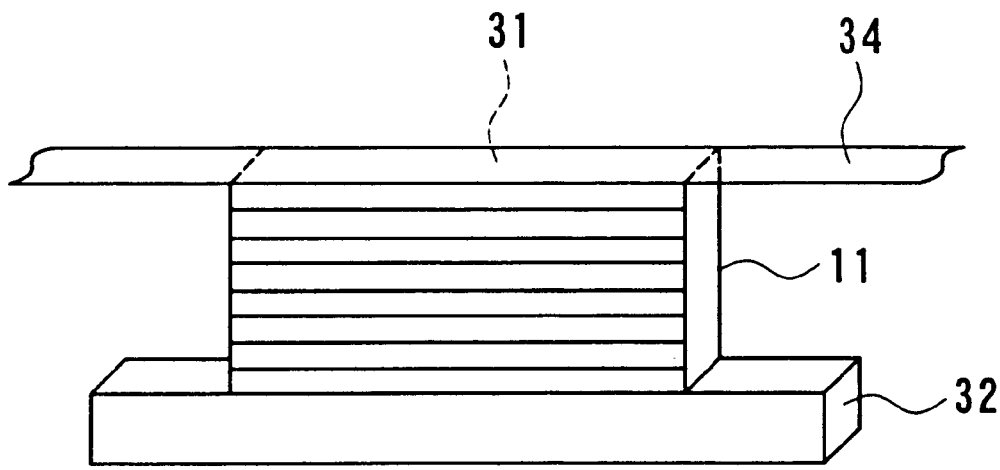
FIG. 11 is a perspective view illustrating the state in which an end face of the slider material is covered with a protection material, according to the embodiment.

The step of fabricating a head aggregate will now be described. In this step, as shown in FIG. 11, the end face 31 is covered with a protection material 34 so that the polished end face 31 is prevented from being damaged or eroded. The protection material 34 may be IC tape (wafer tape) used in the step of dicing to the step of mounting of semiconductors. Alternatively, the protection material 34 may be anti-static tape whose base material includes a conductive substance. The protection material 34 may be a dry film resist used for photolithography. In this case, the dry film resist may be used as a photoresist utilized in formation of rails described later.

Figure 12:
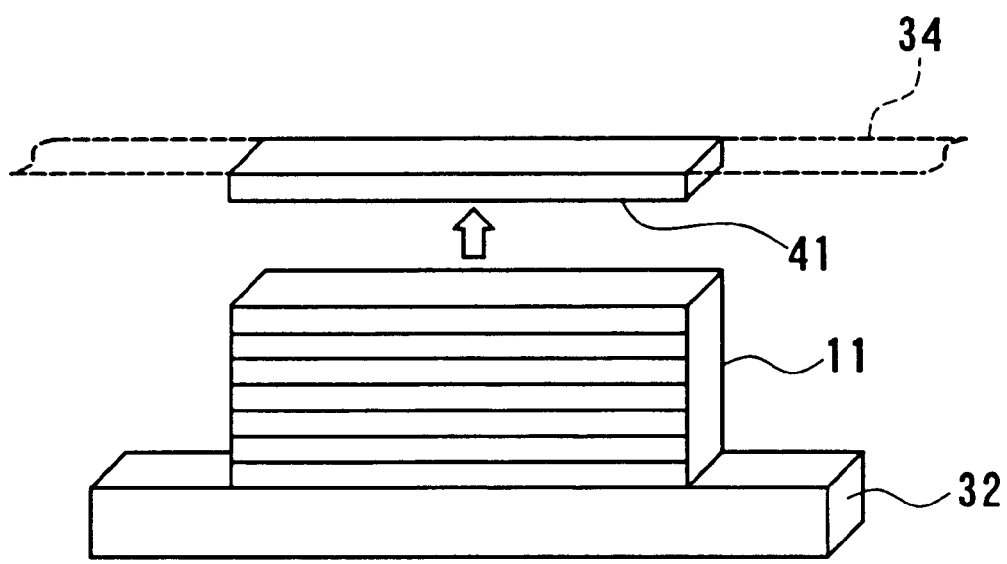
FIG. 12 is a perspective view for illustrating the step of cutting the slider material in the embodiment.

In the step of fabricating a head aggregate, as shown in FIG. 12, the slider material 11 is then cut by a cutting, apparatus while the end face 31 is covered with the protection material 34, such that a row of slider sections including the end face 31 is separated from the rest of the slider materials 11. In this case, the slider material 11 is cut at the inter-row cutting section 3 shown in FIG. 6. The row of slider section thus separated from the slider materials 11 is a slider aggregate 41 made up of the row of slider section having gone through processing. In the step of fabricating a head aggregate, processing of the surface to be the medium facing surfaces and cutting are repeated as long as the slider materials 11 remain.

In the step of fabricating a head aggregate, although not shown, the section of the slider aggregate 41 is then polished to eliminate warpage in the section.

Figure 13:
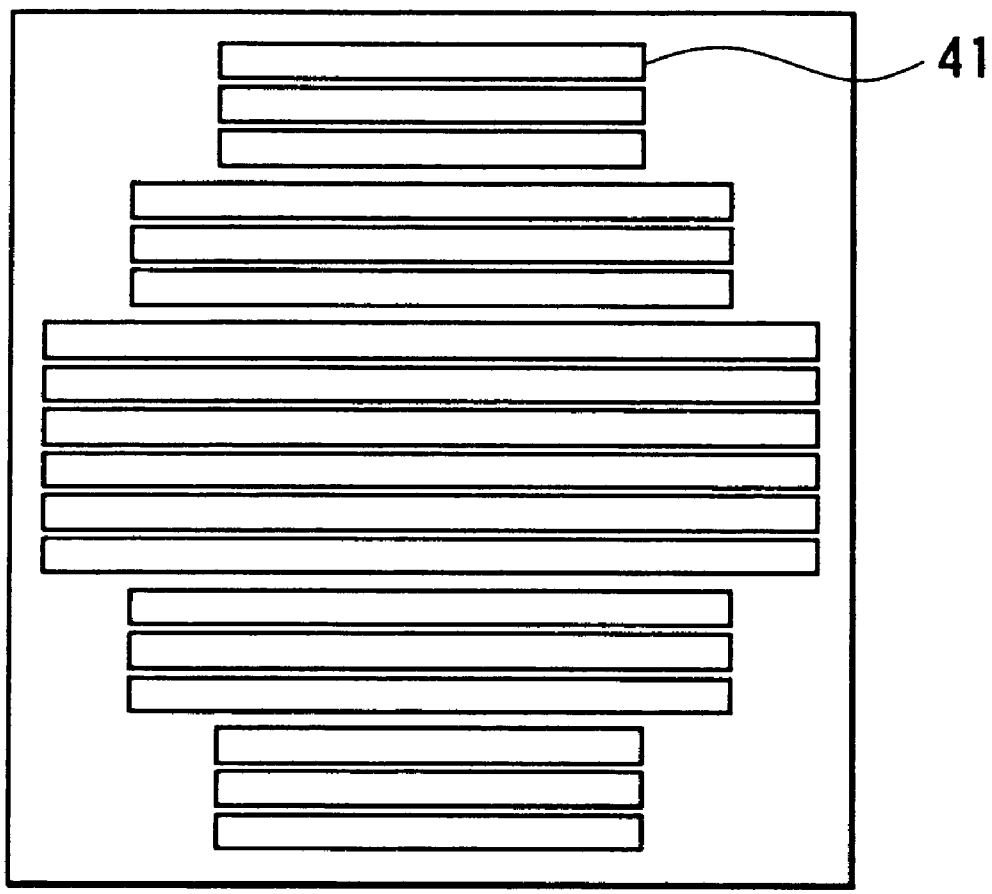
FIG. 13 is an explanatory view for illustrating the step of forming rails in a surface to be medium facing surfaces of a slider aggregate in the embodiment.

In this step, as shown in FIG. 13, a plurality of slider aggregates 41 are then aligned in rows. A photoresist pattern for etching is formed on the surfaces of the slider aggregates 41 to be medium facing surfaces. Through the use of the photoresist pattern, the slider aggregates 41 are etched by dry etching. Rails are thereby formed in the surfaces to be the medium facing surfaces of the slider aggregates 41.

Figure 14:
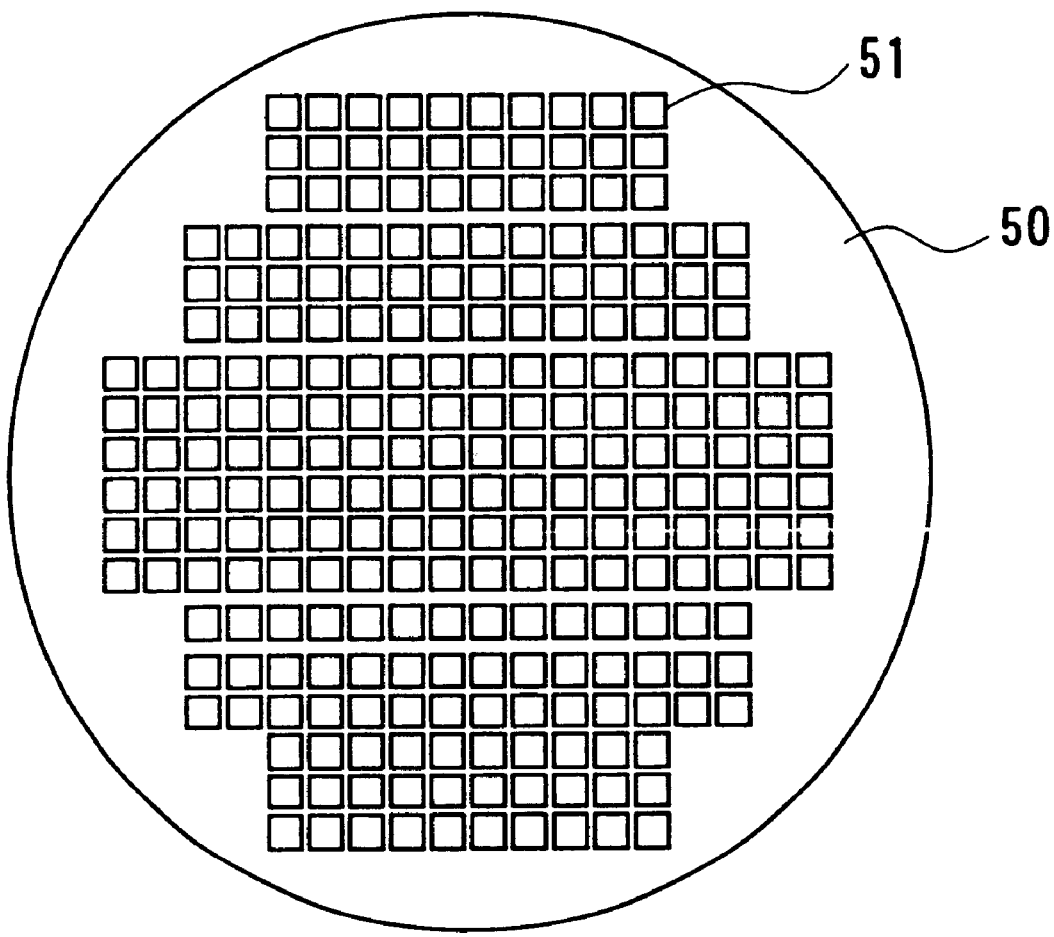
FIG. 14 is an explanatory view for illustrating the step of separating the slider aggregate in the embodiment.

The step of fabricating sliders will now be described. In this step, as shown in FIG. 14, the plurality of slider aggregates 41 in which the rails are formed are aligned and In tape is applied to the slider aggregates 41. The slider aggregates 41 are cut at the intra-row cutting sections 4 shown in FIG. 6 by a cutting apparatus. Sliders 51 are thus obtained.

Figure 15:
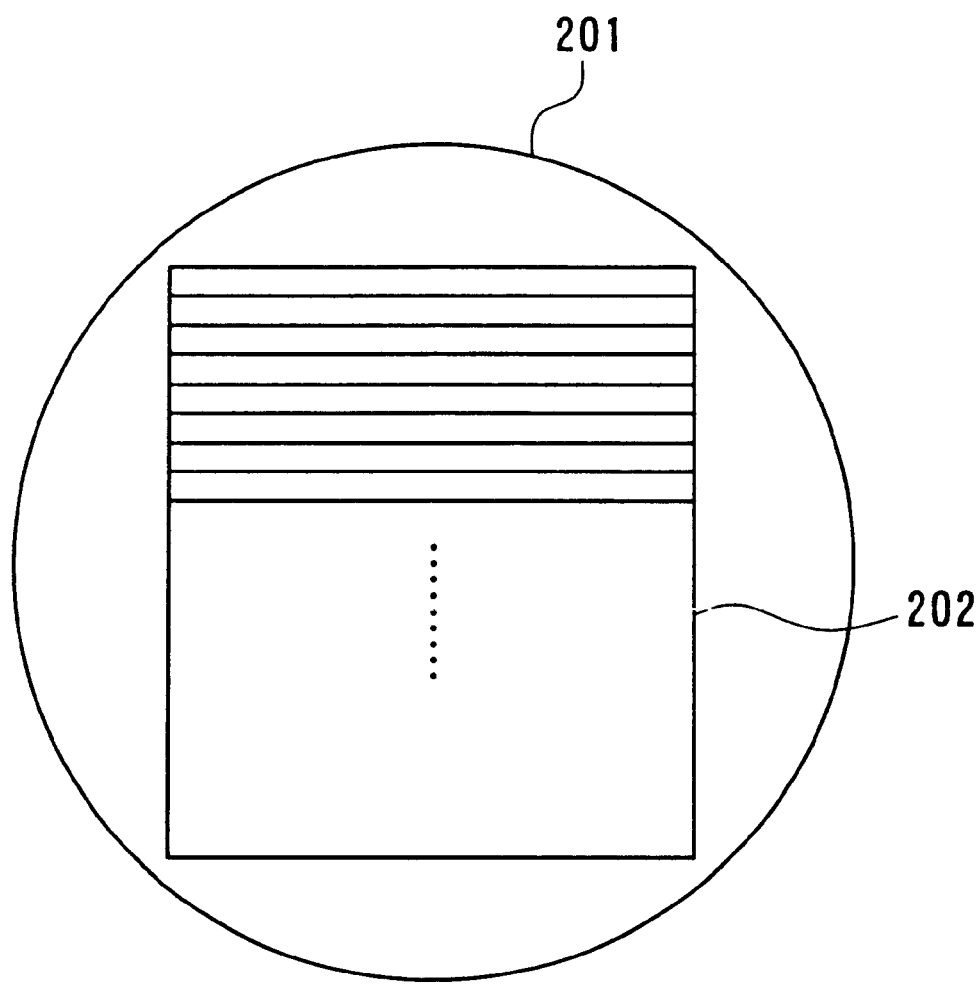
FIG. 15 is an explanatory view for illustrating a prior-art method for cutting out rectangular blocks from a circular wafer.

According to the embodiment described so far, a plurality of types of slider materials 11 having different widths are cut out from the circular-plate-shaped wafer 1 to obtain the slider materials 11. As a result, it is possible to reduce wasted portions in the wafer 1 in which no slider material 11 is obtained. The number of sliders 51 obtained from the circular wafer 1 is as large as possible. According to the embodiment, compared to the prior-art method as shown in FIG. 15, the number of sliders 51 obtained from the 3-inch wafer 1a is increased by 40% or more. The number of sliders 51 obtained from the 6-inch wafer 1b is increased by 50% or more. The number of sliders 51 obtained from the 8-inch wafer 1c is increased by 60% or more.

According to the embodiment, the slider material 11 utilized includes rows of slider sections aligned in one orientation and has a specific width. Through the use of the slider material 11, the steps of processing of the surface to be medium facing surfaces and separating the slider aggregate 41 are repeated. As a result, these steps are easily performed. According to the embodiment, the medium facing surfaces in the state of the slider material 11 are lapped. It is thereby possible to reduce damage to the medium facing surfaces such as twists or cambers and to improve the flatness of the medium facing surfaces. As a result, thin-film magnetic head sliders having excellent properties are obtained.

If the manufacturing steps include the step that requires different sorts of handling of the slider materials 11 depending on the widths of the materials 11, handling of the materials 11 is complicated when the number of materials 11 is too large. According to the embodiment, the number of types of slider materials 11 is as small as two or three. As a result, handling of the materials 11 is not so complicated, and it is possible to obtain a large number of sliders 51.

Handling of the slider materials 11 is complicated, too, if the number of rows of slider sections in each of the materials 11 is greatly different from that of the other materials 11. It is therefore preferred that the number of rows of slider sections in each of the materials 11 fall within a specific range. If the number of rows of slider sections in each of the materials 11 is too small, the number of repetitions of the steps of processing of the surface to be medium facing surfaces and cutting is reduced, and these steps are thereby complicated. In contrast, if the number of rows of slider sections in each of the materials 11 is too large, the states of the slider material 11 are greatly different between when the number of rows of slider sections remaining in the slider material 11 is large and small. The characteristics pertinent to processing or cutting may be thus vary. Therefore, the number of rows of slider sections in each of the materials 11 is preferably 4 to 10.

According to the embodiment, the electrodes 26 for monitoring connected to the detection elements 25 are formed in the inter-row cutting sections 3 in the wafer 1. As a result, the pitch of the slider sections 2 in each row is reduced while high-precision processing is achieved through the detection elements 25 for detecting an amount of processing. The number of thin-film magnetic heads obtained is thus increased.

According to the embodiment, the detection elements 25 and the leads 27 for monitoring are formed in the intra-row cutting sections 4. As a result, it is possible to manufacture thin-film magnetic heads in which the leads 27 connected to the detection elements 25 would not remain. It is therefore possible to prevent the adverse effects such as the leads catching noises or causing static damage.

The invention is not limited to the embodiment described above but may be practiced in still other ways. For example, the number of kinds of the slider materials 11 may be four or more. The width of the slider materials 11 is not limited to those mentioned in the foregoing embodiment. The number of rows of slider sections included in one of the slider materials 11 may be two or three, or eleven or more.

The invention is not limited to sliders for thin-film magnetic heads but may be applied to sliders utilized in other applications, such as sliders used for heads (pickups) for recording or reproducing data through an optical recording system or a magneto-optical recording system.

According to the method of manufacturing slider materials, the method of manufacturing sliders, or the sliders of the invention, a plurality of kinds of slider materials having different widths are cut out from the circular-plate-shaped wafer to obtain the slider materials. As a result, processing is facilitated through the use of the slider material for manufacturing sliders from the circular-plate-shaped wafer. The number of sliders obtained is as large as possible.

Obviously many modifications and variations of the present invention are possible in the light of the above teachings. It is therefore to be understood that within the scope of the appended claims the invention may be practiced otherwise than as specifically described.

What is claimed is:

1. Slider materials each having a specific width and including a plurality of rows of sections to be sliders aligned in one orientation, wherein:

the slider materials are obtained through cutting at least three types of slider materials out of a circular-plate-shaped wafer including the plurality of rows of the sections to be the sliders aligned in the one orientation, the at least three types of slider materials being different from each other in at least either width or the number of rows of the sections to be the sliders.

2. The slider materials according to claim 1 wherein a diameter of the wafer is any of 76.2 mm, 152.4 mm and 203.2 mm.

3. The slider materials according to claim 1 wherein the widths of the slider materials are two types.

4. The slider materials according to claim 3 wherein the widths of the slider materials are two types of 69.6 mm±5% and 57.6 mm±5%.

5. The slider materials according to claim 1 wherein the widths of the slider materials are three types.

6. The slider materials according to claim 5 wherein the widths of the slider materials are three types of 69.6 mm±5%, 57.6 mm±5%, and 38.4 mm±5%.

7. The slider materials according to claim 1 wherein the slider materials include four to ten rows of the sections to be the sliders.

8. The slider materials according to claim 1 wherein the sections to be the sliders include thin-film magnetic head elements.

* * * * *